United States Patent [19]
Gwinn

[11] Patent Number: 5,641,153
[45] Date of Patent: Jun. 24, 1997

[54] AUXILIARY DAMPER FOR RUBBER SUSPENSION MOUNTINGS

[75] Inventor: James T. Gwinn, Erie, Pa.

[73] Assignee: Lord Corporation, Erie, Pa.

[21] Appl. No.: 568,007

[22] Filed: Dec. 6, 1995

[51] Int. Cl.⁶ .................... B60G 11/22; F16F 1/40
[52] U.S. Cl. ............. 267/294; 267/140.13; 267/140.4; 267/141.1
[58] Field of Search .................. 267/292, 293, 267/294, 134, 140.11, 140.13, 140.4, 141.1; 248/562, 636

[56] References Cited

U.S. PATENT DOCUMENTS

| | | | |
|---|---|---|---|
| 2,620,178 | 12/1952 | Lehman | 267/140.4 X |
| 2,691,283 | 10/1954 | Stover | 64/11 |
| 2,940,552 | 6/1960 | Freyler | 188/129 |
| 3,434,708 | 3/1969 | Hawk, Jr. | 267/63 |
| 3,480,268 | 11/1969 | Fishbaugh | 267/1 |
| 4,286,777 | 9/1981 | Brown | 267/294 |
| 4,874,154 | 10/1989 | Zimbone | 267/140.4 |
| 5,100,114 | 3/1992 | Reuter et al. | 267/293 |
| 5,104,101 | 4/1992 | Anderson et al. | 267/294 X |

FOREIGN PATENT DOCUMENTS 643565  9/1928  France .................. 267/292

Primary Examiner—Peter M. Poon
Attorney, Agent, or Firm—Richard K. Thomson; Randall S. Wayland; James W. Wright

[57] ABSTRACT

An auxiliary damper is provided for a passenger cab on heavy equipment or the like, the damper being contained within the confines of the primary suspension system and being secured to a first one of a supported element and a support to provide surface-effect damping as needed to damp high-amplitude, low-frequency vibration in the region of the resonant frequency of the primary suspension. An elastomeric sleeve is bonded to a rigid sleeve member which surrounds the securement bolt for the primary mount. A spool member with internal protrusions engagingly surrounds the elastomeric sleeve. The spool has upper and lower flanges which overlie and underlie, respectively, in non-engaged relationship, the second of a supported element and a support. When there is low-amplitude, high frequency motion of the support, this non-engaged relationship allows the supported element to be isolated from such motion. When the amplitude of the vibration becomes large enough as, for example, near resonance, the spool of the auxiliary damper engages its supported element or support and dissipates the vibrational energy as heat to effectively damp the large amplitude motion and maintain a comfortable ride.

13 Claims, 5 Drawing Sheets

AUXILIARY DAMPER FOR RUBBER SUSPENSION MOUNTINGS

BACKGROUND AND SUMMARY OF THE INVENTION

The present invention is directed to an auxiliary damper for use with rubber or other spring suspension mountings. More particularly, the present invention is directed to an auxiliary surface-effect damper that can be confined within the existing space envelope occupied by the primary suspension mounting.

Laminated rubber and metal mounts have been around for some time. In addition, the focalization of elastomeric mounts has been employed to decouple the translational and rotational vibrational modes in order to greatly simplify the required mounting system needed to provide the necessary damping and isolation.

The present invention proposes to add auxiliary damping to a system to reduce movement at or near the system's resonance frequency. The system may employ an elastomeric spring mount or other type of spring mount in the primary suspension, and preferably will include focalization. An elastomeric sleeve bonded to a rigid collar that surrounds a support bolt for a pair of primary mounts provides a workable surface element for surface-effect (frictional and hysteretic, combined) damping. The bolt secures the primary suspension mountings and auxiliary damper to a first one of a supported element and a support. A metallic sleeve which has a C-shaped cross section and an internal peripheral surface which has cylindrical protrusions formed thereon surrounds the elastomeric sleeve and the protrusions work the elastomer to dissipate energy by hysteresis. The upper flange of the C-shaped sleeve overlies and the lower flange underlies the other of the supported element and the support.

Most preferably, the distance between the flanges exceeds the maximum thickness of that other member and the outer diameter of the central portion of the C-shaped member is smaller than the diameter of the opening in the support. This clearance between the sleeve and its received member permit vibrations of low amplitude, high frequency to be isolated (i.e., not transmitted) from the support vis-a-vis the supported element. When the vibration of the support exceeds this minimally permitted magnitude as, for example, when the disturbance frequency approaches the natural, or resonant, frequency of the system, the auxiliary damper will dissipate the objectionable motion-inducing energy and restore controlled movement between the supported element and the support.

Various features, advantages and characteristics of the present invention will become apparent after a reading of the following specification.

BRIEF DESCRIPTION OF THE DRAWINGS

This section describes the drawings.

DETAILED DESCRIPTION OF THE PREFERRED EMBODIMENTS

Figure 1:
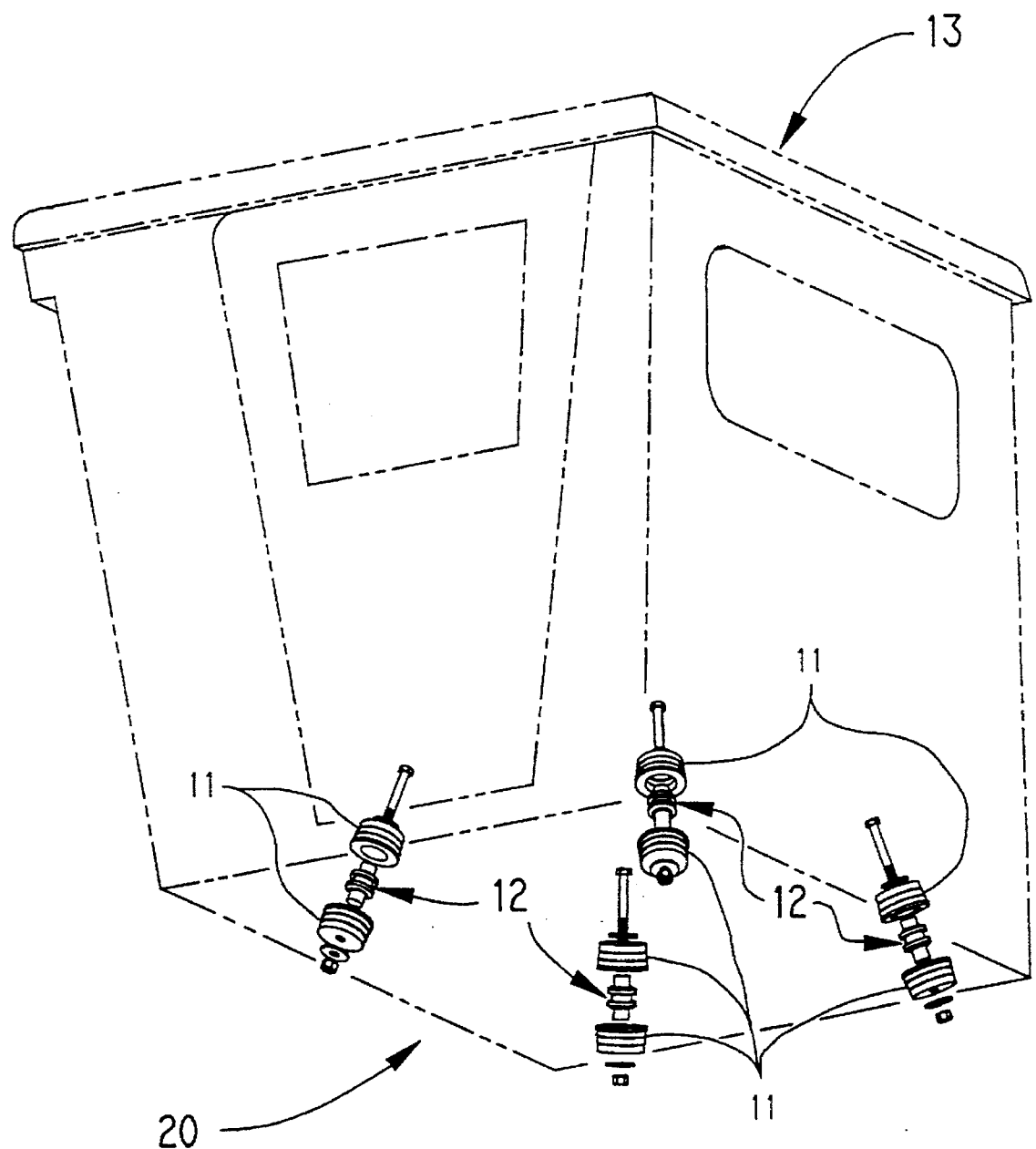
FIG. 1 is isometric schematic depiction of the application of the auxiliary damper of the present invention in a cab mounting system.
Figure 2:
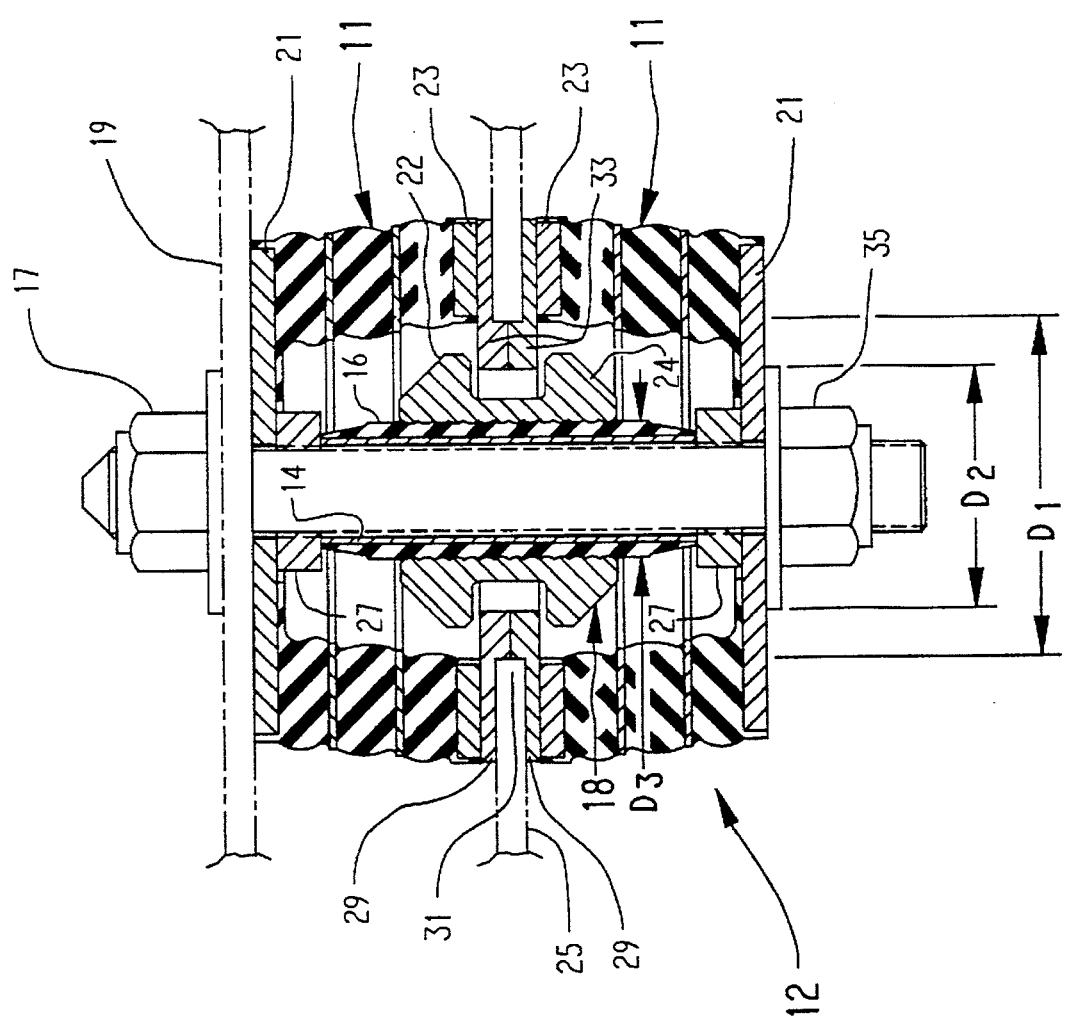
FIG. 2 is a cross-sectional side view of the auxiliary damper of the present invention shown installed within the primary suspension system.

The auxiliary damper 12 of the present invention is shown in FIG. 1 as a part of a mounting system 20 which includes a primary suspension member 11. As depicted in FIG. 1, four focalized primary suspension members 11 are used to support a cab 13 relative to a support or frame 25 (FIG. 2). In practice, a minimum of three members 11 are required to achieve focalization, which results in decoupling of the rotational and translational modes of vibration. Focalization is well known in the industry and has been aptly described in commonly assigned U.S. Pat. No. 2,685,425, which is hereby incorporated by reference.

Figure 5:
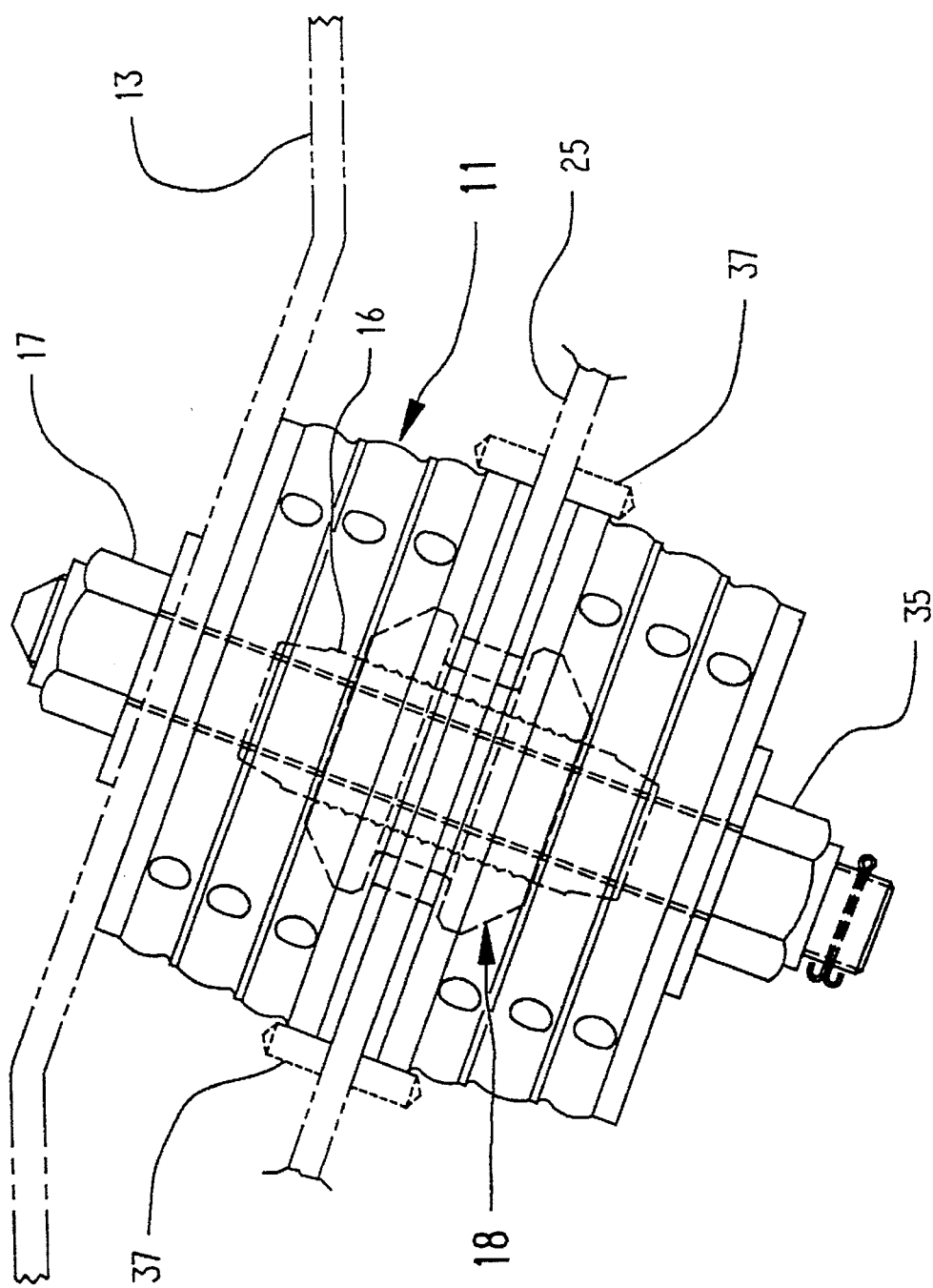
FIG. 5 is a side view of the auxiliary damper of the present invention in the application of FIG. 1.

As best seen in FIGS. 2 and 5, auxiliary damper 12 of the present invention is received within a pair of aligned primary suspension members 11 which are held in alignment by suspension bolt 17. Bolt 17 secures inner sleeve 14 to supported element 19 which is, in this utilization, a floor portion of cab 13. Cab 13 may, for example, be the passenger compartment of a tractor, combine, or other farm or industrial equipment. Primary suspension members 11 are preferably elastomeric mounts of laminated metal-and-elastomer construction having upper (21) and lower (23) plates laminated to the respective upper most and lowermost elastomeric surface layers.

These mounts 11 function as both spring members (storing and releasing energy) and dampers (dissipating energy as heat). Lower plates 23 are positioned on either side of a support 25 which, in this application, may comprise a portion of the vehicular frame. Lower plates 23 are clamped against a pair of split-ring members 29 which facilitate assembly of the suspension system 20 with support 25. Support 25 has an opening formed therein with an innermost periphery 31 having a diameter $D_1$. Split-ring members 29 each have a flange 33 which has a height of one-half the thickness of support 25 and a width extending from a maximum diameter which is generally equal to $D_1$ and a minimum diameter $D_2$.

Figure 3B:
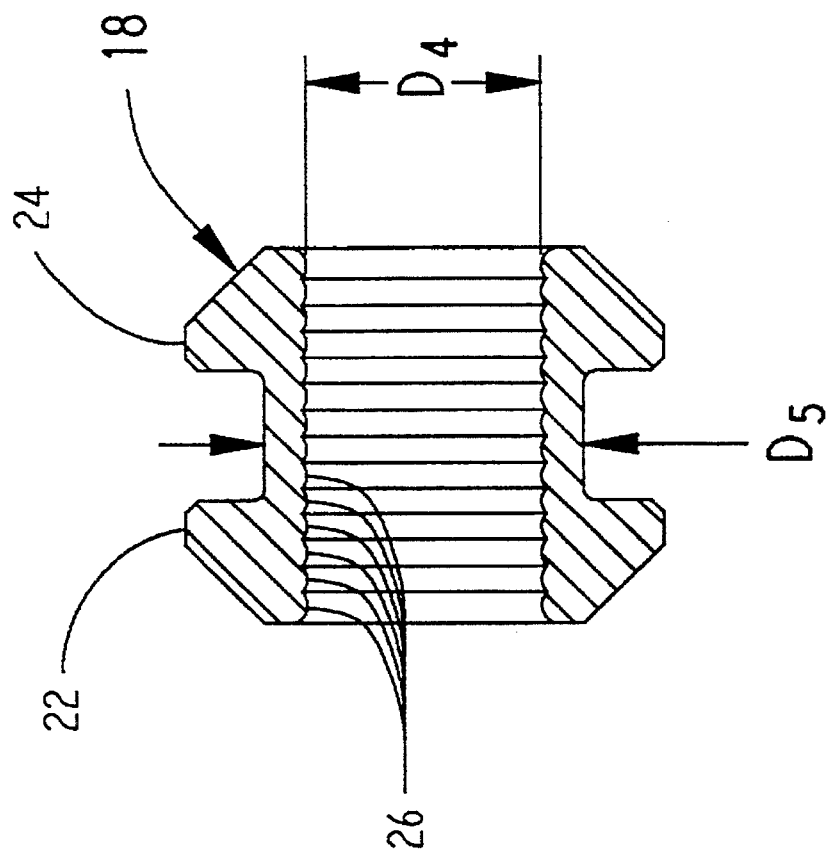
FIG. 3B is a cross-sectional side view of the cylindrical spool as seen along line 3B—3B in FIG. 3A.
Figure 3A:
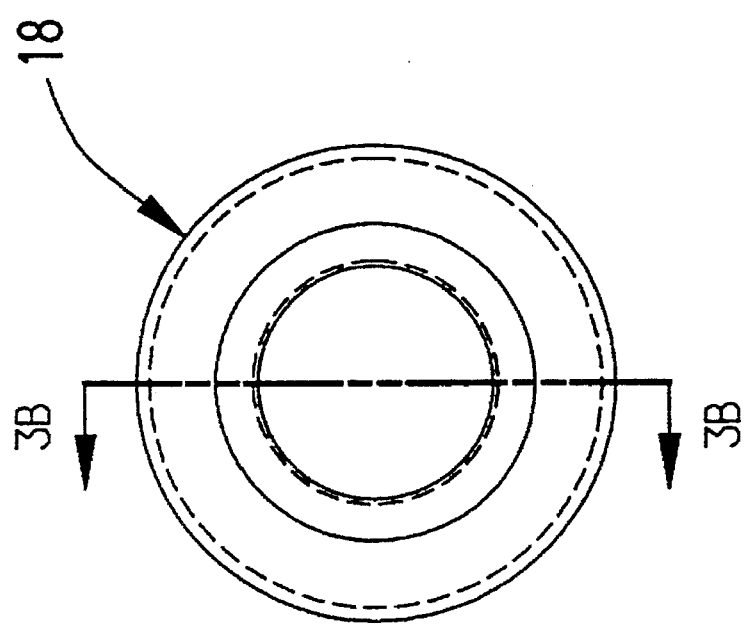
FIG. 3A is an end view of the cylindrical spool of the auxiliary damper of the present invention.

An elastomeric sleeve 16 having an outer diameter $D_3$ is bonded to an external peripheral portion of inner sleeve 14 which is preferably of a metallic or plastic material. Metallic spacer washers 27 are employed to preload the elastomer of primary suspension members 11 by an amount permitted by the combined length of washers 27 and sleeve 14. A cylindrical spool 18 (see FIGS. 3A–B) has an inner diameter $D_4$ which is less than the outer diameter $D_3$ of elastomeric sleeve 16 to create an interference fit between the two. Upper flange 22 overlies split-rings 33 and lower flange 24 underlies said rings. The spacing between flanges 22 and 24 exceeds the combined thickness of rings 33 and, in its centered, at rest position, spool 18 will not engage rings 33. The inner periphery of spool 18 has a plurality of protrusions 26 thereon which provide hysteresis damping when spool 18 is moved relative to elastomeric sleeve 16. Minimum outer diameter $D_5$ of spool 18 is less than the maximum diameter $D_2$ of flanges 33 on split-rings 29.

In assembling the suspension system 20, bolt 17 is inserted through a hole in supported element 19 and plate 21. Washers 27 may be internally threaded to afford the possibility of partial preassembly. Four equally space centering pins 37 (two shown) extending through support 25 may be utilized to assist in positioning the two suspension members 11 on opposite sides of support 25 (FIG. 5). Sleeve 14 is slid over bolt 17 with spool 18 preassembled thereon and second washer 27 threaded onto bolt 17. The cab 13 with its four partially assembled suspension members 11 are positioned relative to frame 25. Split-rings 33, which are halved along a diameter, are installed with flanges 33 capturing the peripheral edge 31 of the opening in support 25. Most preferably, the two diametrical seams in split-rings 33 will be offset at right angles so as not to form a break line.

Lower suspension member 11 is positioned and nut 35 tightened to bring each of upper plates 21 into engagement with its respective spacer washer 27 to provide the designed preload of the elastomer in members 11. The weight of cab 13 can be taken into account to equalize the loading on upper and lower members 11 by varying the unloaded thickness of the mounts and/or their respective static spring rates.

In operation, the paired primary suspension members 11 will isolate the cab 13 from low amplitude, generally high frequency, vibrations through the "spring action" of the elastomeric layers, the lower of the paired members 11 preventing rebound motion. Should the support be subject to a large amplitude, typically, low frequency vibration, the flanges 33 of split-rings 29 will engage the overlying (22) and underlying (24) flanges successively causing spool 18 to translate relative to elastomeric sleeve 16. This translational motion will induce surface-effect damping (i.e., damping having both frictional and hysteresis components), causing this high amplitude vibrational energy to be dissipated as heat. This is particularly important for frequencies in the 15–20 Hz range which tend to be the natural frequency of the suspension system. Without the interaction of the auxiliary damper 12 of the present invention, the vibrational input from support 25 would be amplified as it was transmitted to the passenger compartment 13. Not only would this produce significant discomfort for the equipment operator, it might cause her/him to lose control of the vehicle resulting in significant danger to herself/himself and others.

The auxiliary damper 12 maintains a smooth ride through any transition through the resonant frequency occurring during low speed operation of the vehicle. The smaller diameter $D_5$ vis-a-vis the inner diameter $D_2$ of rings 29 permits some relative lateral and torsional movement of support 25 relative to cabin 13 without engaging the damper 12. It will be understood that while the auxiliary damper 12 provides a necessary and beneficial function of damping out excess motion, its engagement will result in some cab movement and, therefore, some transmission of vibration to the passenger compartment; hence, the preference for the isolation of spool 18 from engagement with support 25 when damping is not needed. As seen in FIG. 5, each of the suspension members 11 and associated auxiliary dampers 12 are canted from vertical some 21.5° to provide the desired focalization of the system 20. This will provide a center of restraining elastic force which coincides with the center of gravity of cab 13.

Figure 4:
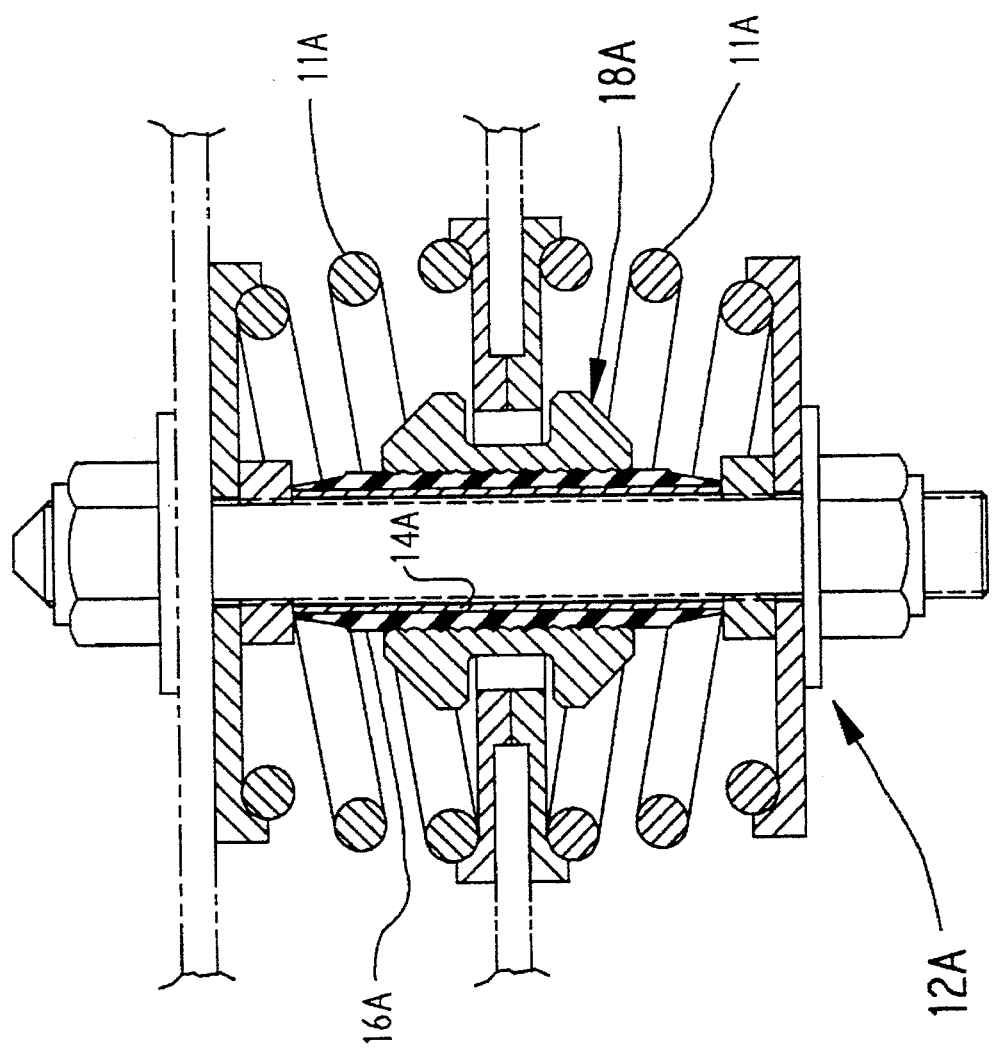
FIG. 4 is a cross-sectional side view of an alternative application of the auxiliary damper of the present invention.

A second embodiment of the present invention is depicted in FIG. 4 generally at 12a. While for most applications the spring member of the primary suspension member will most preferably be an elastomeric mount of laminated construction, for some applications it may be desirable to utilize a coil spring 11a. The principles of operation of the auxiliary damper 12a remains unchanged in this embodiment. The restorative and damping forces of the primary suspension are simply provided by a pair of coil springs 11a depicted in FIG. 4 as conically coiled.

The present invention of an auxiliary surface-effect damper which is entirely contained within the existing suspension mount provides an easy, inexpensive solution to what is potentially a complex problem of what to do about damping large amplitude vibration associated with the resonant frequency of the primary suspension mount.

Various changes, alternatives and modifications will be apparent to a person of ordinary skill in the art following a reading of the foregoing application. It is intended that all such changes, alternatives and modifications as fall within the scope of the appended claims be considered part of the present invention.

I claim:

1. An auxiliary damper for controlling undesired vibratory motion of a supported element relative to a support in connection with a fluidless primary suspension member, said auxiliary damper including:

a) an elastomeric sleeve at least partially surrounding a support bolt and fixed against axial movement relative thereto, said sleeve being attached to one of said supported element and said support;

b) a spool-shaped member surrounding said elastomeric sleeve, and having protruding surface portions on an internal surface for engaging said elastomeric sleeve and deforming it to create frictional and hysteretic damping upon relative movement between said sleeve and said spool, said spool-shaped member being engagable with another of said supported element and said support and to move generally in conjunction therewith during large amplitude movements thereof;

said auxiliary damper being substantially entirely contained within said primary suspension member so as not to require additional space.

2. The auxiliary damper of claim 1 wherein said primary suspension element comprises a pair of spring dampers positioned on either side of said another of said supported element and said support.

3. The auxiliary damper of claim 2 wherein said spring dampers comprise elastomeric spring dampers, each said elastomeric spring damper being of laminated elastomer-and-steel-spacer-plate construction.

4. The auxiliary damper of claim 3 wherein said support bolt extends through said pair of elastomeric spring dampers, attaches said supported element to said support and precompresses said pair of elastomeric spring dampers.

5. The auxiliary damper of claim 4 further comprising a rigid sleeve made from a material selected from a list consisting of steel, aluminum, and plastic, said sleeve surrounding said support bolt and having said elastomeric sleeve bonded thereto.

6. The auxiliary damper of claim 5 wherein said pair of elastomeric spring dampers with said support bolt and auxiliary damper form a first unit of at least three such units in a localized mounting system.

7. The auxiliary damper of claim 1 wherein said primary suspension element comprises a pair of metallic conical springs positioned on either side of said another of said supported element and said support and said auxiliary damper is received in the center thereof.

8. The auxiliary damper of claim 1 wherein said spool-shaped member is C-shaped in axial cross section, having an upper flange overlying said another of said supported element and said support and a lower flange underlying said another of said supported element and said support.

9. The auxiliary damper of claim 8 further comprising two ring inserts overlying and underlying an inner peripheral surface of said another of said supported element and said support to facilitate installation.

10. The auxiliary damper of claim 9 wherein said upper flange and said lower flange are spaced by a distance greater than an accommodated thickness of said another of said supported element and said support and said overlying and underlying ring inserts.

11. The auxiliary damper of claim 10 wherein said spool-shaped member has a minimum diameter which is less than said minimum diameter of said ring inserts whereby said spool-shaped member is free to move relative to said another of said supported element and said support without creating damping along any of three primary directional axes such that low amplitude high frequency vibrations in said support are isolated from said supported element.

12. A fluidless mounting system for controlling undesired vibratory motion of a supported element relative to a support comprising:

a) a primary suspension member including spring means to isolate said supported element from a vibrational input of said support, said spring means having a resonant frequency in a low frequency range, said primary suspension member being attached to a first one of said supported element and said support by a support bolt;

b) an elastomeric sleeve at least partially surrounding said support bolt and fixed against axial movement relative thereto, said sleeve being attached to said first one of said supported element and said support;

c) a spool-shaped member engagable with a second one of said supported element and said support, surrounding said elastomeric sleeve, and having protruding surface portions on an internal surface for engaging said elastomeric sleeve and deforming it to create frictional and hysteretic damping upon relative movement between said sleeve and said spool to damp potentially large amplitude, low frequency vibrations occurring at resonance;

said auxiliary damper being substantially entirely contained within said primary suspension member so as not to require additional space.

13. The mounting system of claim 12 wherein said system includes at least three primary suspension elements mounting said supported member on said support, said at least three primary elements forming a localized mounting system.

* * * * *